(No Model.)

W. T. OLIVER.
ANCHOR TRIPPING DEVICE.

No. 361,539. Patented Apr. 19, 1887.

Attest:
Walter Donaldson
F. L. Middleton

Inventor:
W. T. Oliver
by Joyce & Spear
Attys.

United States Patent Office.

WOODBURY T. OLIVER, OF BATH, MAINE.

ANCHOR-TRIPPING DEVICE.

SPECIFICATION forming part of Letters Patent No. 361,539, dated April 19, 1887

Application filed March 5, 1886. Renewed October 6, 1886. Serial No. 215,486. (No model.)

*To all whom it may concern:*

Be it known that I, WOODBURY T. OLIVER, of Bath, in the county of Sagadahoc and State of Maine, have invented a new and useful Improvement in Anchor-Tripping Devices; and I do hereby declare that the following is a full, clear, and exact description of the same.

My invention is an improved anchor-tripping device. It is designed to enable sailors to cast off anchors at any time, by night or day, easily and readily, and without the use of any tool or instrument, but by simply turning a hand-wheel. It is designed also for simplicity and compactness and for application to any ordinary cat-head.

Figure 1:
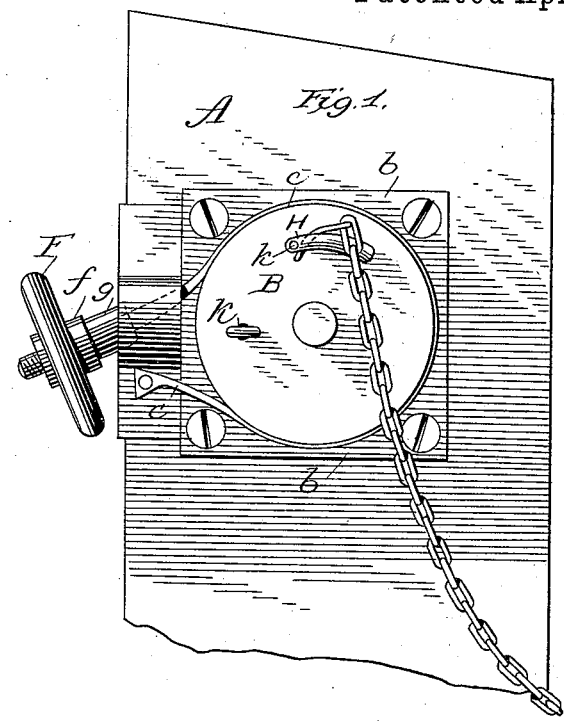
Figure 2:
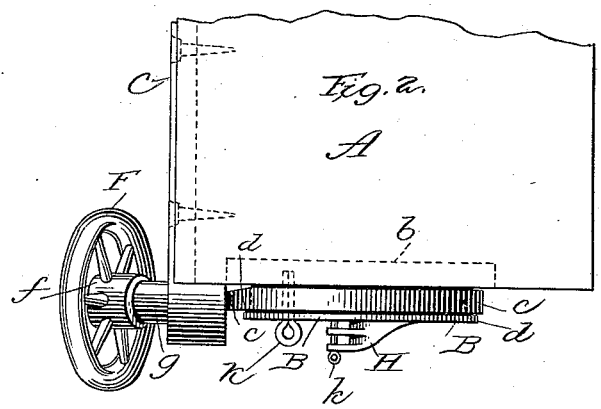
Figure 3:
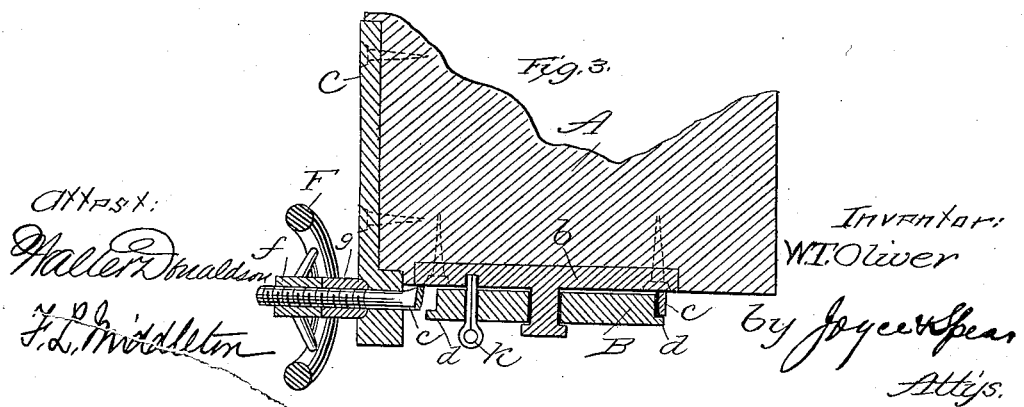

In the accompanying drawings, Figure 1 shows a side elevation of the cat-head and the wheel and releasing friction-strap in side elevation, the wheel being in position to hold the chain. Fig. 2 is a plan view of Fig. 1. Fig. 3 represents a horizontal section through the operating-wheel and the wheel or disk for supporting the chain.

In the drawings, A represents the cat-head. On the side of this is pivoted a wheel, B, adapted, when released, to turn freely upon its pivoting-bolt. This bolt is set into a plate, $b$, let into the cat-head flush with the surface thereof. On the inner face of the cat-head is another plate, C, to which is pivoted or fastened at one end a spring friction-strap, $c$. This strap surrounds the wheel, being held thereto by a flange, $d$, passing through a lug on the plate C, and the end of the strap, being rounded and threaded, is adapted to pass freely through the lug. On the inner end is turned a nut, $f$, this nut being the hub of the hand-wheel F. The inner face of the nut bears against the sleeve or bushing $g$. This may be supported on or cast with the lug, but forms a bearing for the nut. By turning the nut on, the strap is tightened around the wheel, and holds it from turning by frictional contact.

On the face of the wheel is a hook, H, adapted to be connected with the end of the shank, painter, or other chain supporting the anchor. I prefer to make this hook in the form shown, with an interior tongue, $h$, over which a link is hooked, and held in the position shown in Fig. 1, in which it gives greater leverage to the chain for turning the wheel when the anchor is to be released. The wheel is turned to bring the hook to the upper side, as shown in the figure, when the chain is to be attached thereto, the nut having been turned on so as to properly draw on the strap.

To let go the anchor, it is only necessary to turn the hand-wheel backward and loosen the strap upon the wheel, when the weight of the anchor will turn the wheel to cause the chain to slip from the hook.

The wheel can be readily found, even in the dark, and can be turned by direct application of the hand and without the trouble of finding any tool to manipulate it.

For the greatest security at sea, I provide a pin, K, which is inserted through a hole in the wheel into a corresponding hole in the plate to lock the wheel to the plate. A pin, $k$, may also be inserted through the end of the hook in the wheel to prevent any accidental release of the chain.

The entire apparatus may be made of any suitable metal, and can be supplied to the trade ready for application to cat-heads in common use.

I claim as my invention—

1. In combination with a cat-head, a wheel pivoted on the side thereof, having a hook on its face adapted to connect with the chain supporting the anchor, a strap fixed at one end and surrounding the wheel, the other end being threaded and projecting through the lug, also fixed to the cat-head, and a nut having a hand-wheel for turning the same, all substantially as described.

2. In combination with a wheel pivoted on the cat-head, the fixed lug, the strap, and the nut on the end of the strap, and the hook H, having a tongue, $h$, substantially as described.

3. In combination with a wheel pivoted on the side of the cat-head, and with a holdingstrap, the lug on the nut and the pin K, passing through the wheel into the plate beneath, substantially as described.

4. The plate b, adapted to be let into the side of the cat-head, the wheel pivoted thereon, having a hook to connect with the anchor-supporting chain, the lug, and the nut threaded upon the end of the strap, all substantially as described.

In testimony whereof I have signed my name to this specification in the presence of two subscribing witnesses.

WOODBURY T. OLIVER.

Witnesses:
   JOHN R. TONTZ,
   CHAS. E. KELLY.